(12) United States Patent
Yamaguchi et al.

(10) Patent No.: US 10,475,590 B2
(45) Date of Patent: Nov. 12, 2019

(54) ELECTROLYTIC CAPACITOR AND METHOD FOR PRODUCING SAME

(71) Applicant: Panasonic Intellectual Property Management Co., Ltd., Osaka (JP)

(72) Inventors: Nobuyuki Yamaguchi, Saga (JP); Koji Fukuchi, Saga (JP); Koji Okamoto, Kyoto (JP); Tetsuro Iwasa, Kyoto (JP); Takahiro Kobayashi, Saga (JP); Yasuo Tanaka, Shiga (JP); Ryo Morioka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/870,839

(22) Filed: Jan. 12, 2018

(65) Prior Publication Data

US 2018/0158618 A1 Jun. 7, 2018

Related U.S. Application Data

(63) Continuation of application No. PCT/JP2016/003441, filed on Jul. 25, 2016.

(30) Foreign Application Priority Data

Jul. 31, 2015 (JP) .................................. 2015-152810

(51) Int. Cl.
*H01G 9/025* (2006.01)
*H01G 9/028* (2006.01)
(Continued)

(52) U.S. Cl.
CPC .......... *H01G 9/028* (2013.01); *C08G 61/126* (2013.01); *C09D 5/24* (2013.01); *H01G 9/0036* (2013.01);
(Continued)

(58) Field of Classification Search
CPC .......... H01G 9/15; H01G 9/025; H01G 9/028; H01G 9/0036; H01G 9/07
(Continued)

(56) References Cited

U.S. PATENT DOCUMENTS

2008/0316680 A1* 12/2008 Iida .................. H01G 9/025
361/523
2011/0051321 A1 3/2011 Yamaguchi et al.
(Continued)

FOREIGN PATENT DOCUMENTS

CN 101136285 A 3/2008
CN 102005313 A 4/2011
(Continued)

OTHER PUBLICATIONS

International Search Report of PCT application No. PCT/JP2016/003441 dated Sep. 27, 2016.
(Continued)

*Primary Examiner* — Eric W Thomas
*Assistant Examiner* — Arun Ramaswamy
(74) *Attorney, Agent, or Firm* — McDermott Will & Emery LLP (57) ABSTRACT

An electrolytic capacitor includes: an anode body; a dielectric layer formed on the anode body; a first conductive polymer layer which covers at least a portion of the dielectric layer; and a second conductive polymer layer which covers at least a portion of the first conductive polymer layer. The first conductive polymer layer includes a first layer and a second layer. The first layer contains a first conductive polymer and a first dopant, and covers at least a portion of the dielectric layer. The second layer is formed on the first layer, and contains a first silane compound. The second conductive polymer layer contains a second conductive polymer, a second dopant, and a basic compound.

18 Claims, 1 Drawing Sheet

(51) Int. Cl.
*H01G 9/00* (2006.01)
*H01G 9/07* (2006.01)
*C08G 61/12* (2006.01)
*C09D 5/24* (2006.01)
*H01G 9/15* (2006.01)
*C08K 5/42* (2006.01)
*C09D 165/00* (2006.01)
*H01G 9/042* (2006.01)
*H01G 9/052* (2006.01)

(52) U.S. Cl.
CPC ....... *H01G 9/15* (2013.01); *C08G 2261/1424* (2013.01); *C08G 2261/3223* (2013.01); *C08G 2261/512* (2013.01); *C08G 2261/514* (2013.01); *C08K 5/42* (2013.01); *C09D 165/00* (2013.01); *H01G 9/0032* (2013.01); *H01G 9/042* (2013.01); *H01G 9/052* (2013.01); *H01G 9/07* (2013.01)

(58) Field of Classification Search
USPC .................................. 361/523, 525, 526, 527
See application file for complete search history.

(56) References Cited

U.S. PATENT DOCUMENTS

| | | |
|---|---|---|
| 2012/0044615 A1 | 2/2012 | Takahashi et al. |
| 2014/0063691 A1* | 3/2014 | Kosuge .................. H01G 9/025 361/525 |

FOREIGN PATENT DOCUMENTS

| | | |
|---|---|---|
| JP | 2010-177421 A | 8/2010 |
| JP | 2012-043958 | 3/2012 |
| JP | 2012-114128 | 6/2012 |
| JP | 2012-174948 | 9/2012 |

OTHER PUBLICATIONS

Chinese Search Report dated Apr. 28, 2019 for the related Chinese Patent Application No. 201680043963.7.

* cited by examiner

ELECTROLYTIC CAPACITOR AND METHOD FOR PRODUCING SAME

RELATED APPLICATIONS

This application is a continuation of the PCT International Application No. PCT/JP2016/003441 filed on Jul. 25, 2016, which claims the benefit of foreign priority of Japanese patent application No. 2015-152810 filed on Jul. 31, 2015, the contents all of which are incorporated herein by reference.

BACKGROUND

1. Technical Field

The present disclosure relates to an electrolytic capacitor having a conductive polymer layer, and a method for producing the electrolytic capacitor.

2. Description of the Related Art

As small-sized, large capacitance, and low equivalent series resistance (ESR) capacitors, promising candidates are electrolytic capacitors including an anode body on which a dielectric layer is formed and a conductive polymer layer formed so as to cover at least a part of the dielectric layer. The conductive polymer layer includes a conductive polymer such as a $\pi$-conjugated polymer.

In view of improving performance of an electrolytic capacitor, formation of a plurality of conductive polymer layers has been proposed. Unexamined Japanese Patent Publication No. 2012-043958 describes a solid electrolytic capacitor including an anode body, a first conductive polymer layer, and a second conductive polymer layer. Unexamined Japanese Patent Publication No. 2012-043958 suggests that a layer of an amine compound is provided between a first conductive polymer layer and a second conductive polymer layer or in the second conductive polymer layer in view of improving adhesion of the conductive polymer layers.

When a layer of an amine compound is formed on the first conductive polymer layer as described in Unexamined Japanese Patent Publication No. 2012-043958, it is expected that covering property of the second conductive polymer layer over the first conductive polymer layer can be enhanced. However, on the other hand, there has been a possibility that conductivity of the conductive polymer layer containing the layer of an amine compound is lowered and thus ESR is increased.

Thus, in recent years, further improvement for reducing ESR is required in an electrolytic capacitor.

SUMMARY

An electrolytic capacitor according to a first aspect of the present disclosure includes an anode body, a dielectric layer formed on the anode body, a first conductive polymer layer covering at least a part of the dielectric layer, and a second conductive polymer layer covering at least a part of the first conductive polymer layer. The first conductive polymer layer includes a first layer and a second layer. The first layer contains a first conductive polymer and a first dopant, and covers at least a part of the dielectric layer. The second layer is formed on the first layer, and contains a first silane compound. The second conductive polymer layer contains a second conductive polymer, a second dopant, and a basic compound.

According to the first aspect of the present disclosure, the ESR of the electrolytic capacitor can be reduced.

A method for producing an electrolytic capacitor according to a second aspect of the present disclosure includes a first step and a second step below. The first step includes forming a first conductive polymer layer covering at least a part of a dielectric layer of an anode body, which is provided with the dielectric layer. The formation of the first conductive polymer layer is performed by forming a first layer on the dielectric layer, the first layer containing a first conductive polymer and a first dopant and covering at least a part of the dielectric layer, and forming a second layer containing a first silane compound on the first layer. The second step includes forming a second conductive polymer layer on the first conductive polymer layer, the second conductive polymer layer containing a second conductive polymer, a second dopant and a basic compound and covering at least a part of the first conductive polymer layer.

According to the second aspect of the present disclosure, an electrolytic capacitor having reduced ESR can be produced.

DETAILED DESCRIPTION OF EMBODIMENT

[Electrolytic Capacitor]

Figure 1:
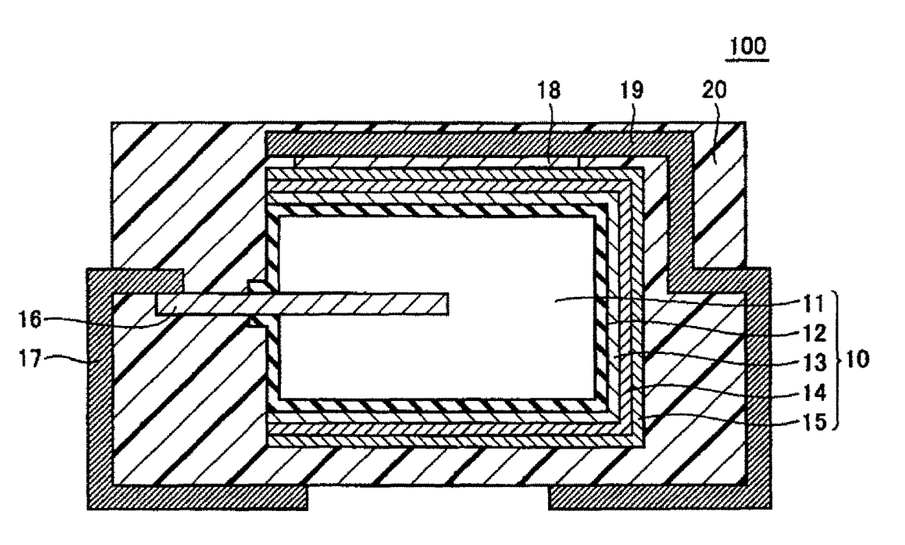
FIGURE is a schematic sectional view illustrating an electrolytic capacitor according to one exemplary embodiment of the present disclosure.

An electrolytic capacitor according to an exemplary embodiment of the present disclosure includes an anode body, a dielectric layer formed on the anode body, a first conductive polymer layer covering at least a part of the dielectric layer, and a second conductive polymer layer covering at least a part of the first conductive polymer layer. The first conductive polymer layer includes a P1 layer (first layer) and an S layer (second layer). The P1 layer contains a conductive polymer (first conductive polymer) and a dopant (first dopant) and covering at least a part of the dielectric layer. The S layer is formed on the P1 layer and contains a silane compound (first silane compound). The second conductive polymer layer contains a conductive polymer (second conductive polymer), a dopant (second dopant), and a basic compound (first basic compound).

In the present exemplary embodiment, since the S layer containing a silane compound is formed on the P1 layer of the first conductive polymer layer, dedoping of the dopant contained in the P1 layer is suppressed even though the second conductive polymer layer containing a basic compound is formed on the first conductive polymer layer. Therefore, since reduction in the conductivity of the first conductive polymer layer is suppressed, the ESR can be reduced.

Also, withstand voltage characteristics of the electrolytic capacitor can be improved. This phenomenon is considered to be due to the following reasons although details of the phenomenon are not clear.

First, it is considered that the silane compound contained in the first conductive polymer layer and the basic compound contained in the second conductive polymer layer interact with or are bonded to each other, resulting in improvement of adhesion between the first conductive polymer layer and the second conductive polymer layer.

Second, by using the basic compound in forming the second conductive polymer layer, it is easy to cover a surface of the first conductive polymer layer with a treatment liquid containing the second conductive polymer. As a result, it is considered that covering property of the first conductive polymer layer over the second conductive polymer layer is improved.

FIGURE is a sectional view schematically showing a configuration of an electrolytic capacitor according to an exemplary embodiment of the present disclosure. In FIGURE, electrolytic capacitor 100 includes capacitor element 10 including anode body 11 having dielectric layer 12 formed on a surface of anode body 11, conductive polymer layer 13 formed on dielectric layer 12, and a cathode layer formed on conductive polymer layer 13. The cathode layer includes carbon layer 14 as a cathode extraction layer, and silver paste layer 15.

Electrolytic capacitor 100 further includes anode lead 16, anode terminal 17, adhesive layer 18, and cathode terminal 19. Anode lead 16 is a rod-like body composed of a valve metal (tantalum, niobium, titanium, aluminum or the like), and is disposed in such a manner that anode lead 16 is embedded in anode body 11 at one end, and protrudes outside capacitor element 10 at the other end. Anode terminal 17 is partially connected to anode lead 16 by welding. In addition, cathode terminal 19 is disposed so as to be connected to silver paste layer 15 as the outermost layer of capacitor element 10 through adhesive layer 18 composed of a conductive adhesive.

Electrolytic capacitor 100 further includes resin outer package 20. Resin outer package 20 seals capacitor element 10 provided with anode lead 16, anode terminal 17, adhesive layer 18 and cathode terminal 19 in such a manner that a portion of anode terminal 17 and a portion of cathode terminal 19 are exposed from resin outer package 20.

Conductive polymer layer 13 includes a first conductive polymer layer and a second conductive polymer layer. The first conductive polymer layer is formed so as to cover dielectric layer 12, and the second conductive polymer layer is formed so as to cover the first conductive polymer layer. The first conductive polymer layer does not necessarily cover whole (a whole surface of) dielectric layer 12, and is satisfactory as long as the first conductive polymer layer is formed so as to cover at least a part of dielectric layer 12. Similarly, the second conductive polymer layer does not necessarily cover a whole (a whole surface of) the first conductive polymer layer, and is satisfactory as long as the second conductive polymer layer is formed so as to cover at least a part of the first conductive polymer layer. In general, a layer containing a conductive polymer may be referred to as a solid electrolyte layer.

Dielectric layer 12 is formed along the surface of anode body 11, and therefore irregularities are formed on a surface of dielectric layer 12 in accordance with a shape of the surface of anode body 11. Preferably, the first conductive polymer layer is formed so as to fill such irregularities of dielectric layer 12.

Hereinafter, a configuration of the electrolytic capacitor will be described in more detail.

(Anode Body)

A conductive material having a large surface area can be used as the anode body. Examples of the conductive material include a valve metal, an alloy including a valve metal, and a compound including a valve metal. These materials can be used alone or in combination of two or more materials. As the valve metal, for example, tantalum, niobium, titanium or aluminum is preferably used. Examples of the anode body include a molded body of particles of a conductive material, a sintered body of the molded body, and a substrate (e.g., foil-like or plate-like substrate) formed of a conductive material and having a roughened surface. The sintered body has a porous structure.

(Dielectric Layer)

The dielectric layer is formed by anodizing, through an anodizing treatment or the like, the conductive material on a surface of the anode body.

As a result of anodizing, the dielectric layer contains an oxide of the conductive material (particularly a valve metal). For example, the dielectric layer includes $Ta_2O_5$ when tantalum is used as the valve metal, and the dielectric layer includes $Al_2O_3$ when aluminum is used as the valve metal. The dielectric layer is not limited to these examples, and a layer is acceptable as the dielectric layer as long as the layer functions as a dielectric body.

When a surface of the anode body is roughened, or the anode body is porous, the dielectric layer is formed along a surface of the anode body (which includes an inner wall surface of pits inside the surface of the anode body).

(First Conductive Polymer Layer)

The first conductive polymer layer includes a P1 layer (first layer) covering at least a part of the dielectric layer, and an S layer (second layer) formed on the P1 layer. The S layer contains a silane compound (first silane compound). The P1 layer contains a conductive polymer (first conductive polymer) and a dopant (first dopant), and may further contain a silane compound (second silane compound) as necessary. The first dopant may be contained in a state in which the first conductive polymer is doped with the dopant, or may be contained with the dopant bonded to the first conductive polymer. In the first conductive polymer layer, the P1 layer and the S layer may each be formed of one layer or may be formed of a plurality of layers. The P1 layer and the S layer may be alternately stacked. For suppressing dedoping of the first dopant caused by a basic compound in the second conductive polymer layer, at least a part of the S layer is preferably interposed between the P1 layer and the second conductive polymer layer.

(P1 Layer)

(Conductive Polymer)

As the conductive polymer, there can be used, for example, a publicly known polymer used for an electrolytic capacitor, such as a π-conjugated conductive polymer. Examples of such a conductive polymer include polymers having, as a basic skeleton, for example, polypyrrole, polythiophene, polyfuran, polyaniline, polyacetylene, polyphenylene, polyphenylene vinylene, polyacene, and/or polythiophene vinylene.

Such a polymer includes a homopolymer, a copolymer of two or more monomers, and derivatives (e.g., a substitute having a substituent) of these polymers. For example, polythiophene includes poly(3,4-ethylenedioxythiophene) or the like. Such a conductive polymer has high conductivity and excellent ESR characteristics.

These conductive polymers may be used alone or in combination of two or more conductive polymers.

A weight average molecular weight of the conductive polymer is not particularly limited, and ranges, for example, from 1,000 to 1,000,000, inclusive.

The conductive polymer can be obtained by, for example, polymerizing a precursor of the conductive polymer. The conductive polymer that is bonded to or doped with the dopant can be obtained by polymerizing a precursor of the conductive polymer in the presence of the dopant. The polymerization may be performed in the presence of the silane compound (first silane compound). Examples of the precursor of the conductive polymer may include a monomer that constitutes the conductive polymer and/or an oligomer in which some monomers are linked to each other. As a polymerization method, both chemical oxidation polymerization and electrolytic oxidation polymerization can be employed. The conductive polymer may be synthesized in advance before being deposited to the dielectric layer. For chemical oxidation polymerization, the polymerization of the conductive polymer may be performed on the dielectric layer.

The first conductive polymer is preferably obtained by polymerizing a precursor of the first conductive polymer on the dielectric layer. In this case, the first conductive polymer penetrates into pores of a surface of the anode body and inner wall surfaces of pits, so that the P1 layer is easily formed, and adhesion and covering property between the dielectric layer and the P1 layer (and therefore the first conductive polymer layer) are easily enhanced.

(Dopant)

Examples of the first dopant include low-molecular-weight dopants and high-molecular-weight dopants. The P1 layer may contain one dopant, or two or more dopants.

As the first dopant, for example, a compound having an anionic group such as a sulfonate group, a carboxy group, a phosphate group (—O—P($=$O)(—OH)$_2$), and/or a phosphonate group (—P($=$O)(—OH)$_2$) is used. The first dopant may include one kind of anionic group, or two or more kinds of anionic groups.

As the anionic group, a sulfonate group is preferred, and a combination of the sulfonate group with an anionic group other than the sulfonate group is also acceptable.

As the low-molecular-weight dopant, a low-molecular-weight compound (monomer compound) having an anionic group as described above can be used. Specific examples of the compound having a sulfonate group, among the compounds described above, include benzenesulfonic acid, alkylbenzenesulfonic acids such as p-toluenesulfonic acid, naphthalenesulfonic acid, and anthraquinonesulfonic acid.

Examples of the polymer dopant having a sulfonate group, among polymer dopants, may include homopolymers of a monomer having a sulfonate group (first monomer), copolymers of the first monomer with another monomer (second monomer), sulfonated phenolic resins (sulfonated phenolic novolak resins, etc.). In the polymer dopant, the first monomer and the second monomer may each be used alone or in combination of two or more monomers.

Examples of the first monomer may include vinylsulfonic acid, allylsulfonic acid, 2-acrylamido-2-methylprop anesulfonic acid, styrenesulfonic acid, and isoprenesulfonic acid. Among these first monomers, it is preferred to use at least an aromatic vinyl monomer having a sulfonate group, such as styrenesulfonic acid. As the second monomer, a monomer not having an anionic group or the like can be used, but a monomer having an anionic group other than a sulfonate group is preferably used.

Also, the polymer dopant is preferably a polyester having a sulfonate group, or the like. Examples of the polyester having a sulfonate group include polyesters including, as the first monomer, a polycarboxylic acid having a sulfonate group and/or a polyol having a sulfonate group, and, as the second monomer, a polycarboxylic acid and a polyol. As the first monomer, a dicarboxylic acid having a sulfonate group is preferably used. As the dicarboxylic acid having a sulfonate group, for example, aromatic dicarboxylic acids such as sulfonated phthalic acid, sulfonated isophthalic acid and sulfonated terephthalic acid, are preferable. As the polycarboxylic acid as the second monomer, polycarboxylic acids having no sulfonate group, for example aromatic dicarboxylic acids such as phthalic acid, isophthalic acid and terephthalic acid are preferable. As the polyol as the second monomer, polyols having no sulfonate group, for example alkylene glycols such as ethylene glycol and propylene glycol are preferable.

In the dopant or a constituent monomer of the polymer dopant, the anionic group is not particularly limited as long as the anionic group can generate an anion in a dissociated state, and the anionic group may be a salt or ester of the above-mentioned anionic group.

The P1 layer is preferably formed by polymerizing a precursor of the first conductive polymer in the presence of the first dopant on the dielectric layer. In this case, it is preferred to use a low-molecular-weight dopant having a relatively low molecular weight as the first dopant in order to have both of a function of a dopant and a function of an oxidizing agent. Here, dedoping of the first dopant may be suppressed by further increasing a thickness of the S layer or by adding a silane compound (second silane compound) to the P1 layer.

In view of suppressing dedoping caused by a basic compound, it is preferable to use the first dopant having a relatively high molecular weight, such as a polymer dopant. In this case, the thickness of the S layer can be decreased, or a proportion of the second silane compound in the P1 layer can be reduced.

A weight average molecular weight of the polymer dopant is, for example, from 1,000 to 1,000,000, inclusive. Use of a polymer dopant having such a molecular weight easily facilitates reduction of ESR.

A ratio of the dopant contained in the first conductive polymer layer preferably ranges from 10 parts by mass to 1,000 parts by mass, inclusive, with respect to 100 parts by mass of the first conductive polymer.

(Silane Compound)

The silane compound (second silane compound) contained in the P1 layer is not particularly limited, and for example, a silicon-containing organic compound can be used. The second silane compound may be contained in the first conductive polymer layer as a silicon-containing component derived from the second silane compound. The silane compound may be interposed between first conductive polymers, or between first conductive polymer and other component such as the first dopant. And the silane compound may be chemically bonded with these components. Here, the first conductive polymer is firmly bonded, and further, withstand voltage characteristics are improved. A part of the silane compound or a silicon-containing component derived from the silane compound may be present at an interface between the dielectric layer and the first conductive polymer layer. Here, the silane compound contributes to improvement of adhesion.

As the silane compound, for example, a silane coupling agent can be used. The silane coupling agent has a reactive organic group and a hydrolysis condensation group. The reactive organic group is preferably an epoxy group, an alkyl halide group, an amino group, a ureido group, a mercapto group, an isocyanate group, a polymerizable group or the like. Examples of the polymerizable group include (meth) acryloyl groups and vinyl groups. An acryloyl group and a methacryloyl group are collectively referred to as a (meth) acryloyl group. The hydrolysis condensation group is preferably an alkoxy group such as, for example, a methoxy group, an ethoxy group or a propoxy group. The silane coupling agents include hydrolysates and condensates of the silane coupling agent.

Examples of the silane coupling agent having an epoxy group may include 2-(3,4-epoxycyclohexyl)ethyltrimethoxysilane, 3-glycidoxypropyltrimethoxysilane (γ-glycidoxypropyltrimethoxysilane), 3-glycidoxypropylmethyldiethoxysilane and 3-glycidoxypropyltriethoxysilane. Examples of the silane coupling agent having an alkyl halide group include 3-chloropropyltrimethoxysilane.

Examples of the silane coupling agent having an amino group may include N-2-(aminoethyl)-3-aminopropylmethyldimethoxysilane, N-2-(aminoethyl)-3-aminopropyltriethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane and salts (e.g., hydrochlorides) of these compounds. Examples of the silane coupling agent having a ureido group include 3-ureidopropyltriethoxysilane and salts (e.g., hydrochlorides) of the compound.

Examples of the silane coupling agent having a mercapto group may include 3-mercaptopropylmethyldimethoxysilane, 3-mercaptopropyltrimethoxysilane and bis(triethoxysilylpropyl)tetrasulfide. Examples of the silane coupling agent having an isocyanate group include 3-isocyanatepropyltriethoxysilane.

Examples of the silane coupling agent having a (meth) acryloyl group may include 3-methacryloxypropylmethyldimethoxysilane, 3-methacryloxypropyltrimethoxysilane, 3-methacryloxypropylmethyldiethoxysilane, 3-methacryloxypropyltriethoxysilane and 3-acryloxypropyltrimethoxysilane (γ-acryloxypropyltrimethoxysilane). Examples of the silane coupling agent having a vinyl group may include vinyltrichlorosilane, vinyltrimethoxysilane, vinyltriethoxysilane and p-styryltrimethoxysilane.

These silane compounds may be used alone, or two or more of the silane compounds may be used in combination. The second silane compounds is preferably a silane coupling agent having an epoxy group or a (meth)acryloyl group because ESR is easily reduced and a capacitance is advantageously enhanced.

(S Layer)

The silane compound (first silane compound) contained in the S layer can be appropriately selected from the compounds exemplified for the second silane compound. The first silane compound may be used alone, or two or more of the silane compounds may be used in combination. The first silane compound may be contained in the first conductive polymer layer as a silicon-containing component derived from the first silane compound.

When a silane coupling agent having a reactive organic group is used as the silane compound, the reactive organic group easily interact or react with a basic compound. Accordingly, adhesion between the first conductive polymer layer and the second conductive polymer layer is easily further enhanced. Particularly, the first silane compound contained in the S layer in contact with the second conductive polymer layer preferably has the reactive organic group for enhancing adhesion. When the silane coupling agent having an epoxy group or a (meth)acryloyl group is used as the first silane compound, reduction of ESR and increase of a capacitance are facilitated. A compound used for the first silane compound and a compound used for the second silane compound may be the same or different from each other.

In the first conductive polymer layer, the first silane compound in the S layer may penetrates into the P1 layer when forming the S layer. In the case of alternately stacking the P1 layer and the S layer, the first silane compound in the S layer may penetrates into the P1 layer not only when forming the S layer, but also when forming the P1 layer. In the first conductive polymer layer, a concentration of the silane compound in the S layer may be higher than a concentration of the silane compound in the P1 layer.

By, for example, energy dispersive X-ray spectroscopy (EDX) or inductively coupled plasma analysis (ICP), it can be examined whether or not the first conductive polymer layer contains a silane compound.

A ratio of the silane compound in the first conductive polymer layer ranges, for example, from 1 part by mass to 20 parts by mass, inclusive, preferably from 3 parts by mass to 15 parts by mass, inclusive, with respect to 100 parts by mass of the first conductive polymer. When the ratio of the silane compound falls within such a range, withstand voltage characteristics can be further improved.

The first conductive polymer layer may contain a basic compound (second basic compound). The basic compound can be selected from the compounds exemplified for the first basic compound described later. However, for suppressing dedoping of the first dopant, a proportion of the basic compound in the first conductive polymer layer is preferably lower than a proportion of the basic compound (first basic compound) in the second conductive polymer layer. Particularly, the first conductive polymer layer preferably does not contain the basic compound for suppressing dedoping.

The first conductive polymer layer (P1 layer and/or S layer) may further contain, as necessary, a known additive and/or a known conductive material (e.g., manganese dioxide or TCNQ complex salt) other than the conductive polymer. A layer for enhancing adhesion, or the like may be interposed between the dielectric layer and the first conductive polymer layer.

(Second Conductive Polymer Layer)

The second conductive polymer layer contains a conductive polymer (second conductive polymer), a dopant (second dopant), and a basic compound (first basic compound). In the second conductive polymer layer, the dopant may be contained in a state in which the second conductive polymer is doped with the dopant, or may be contained with the dopant bonded with the second conductive polymer.

The conductive polymer and the dopant can be each selected from those exemplified for the first conductive polymer layer. For the second conductive polymer, polymerization of a precursor of the conductive polymer may be performed in the presence of the dopant and/or the basic compound. The second conductive polymer is preferably synthesized in advance before being deposited to the first conductive polymer layer. For example, the second conductive polymer layer is preferably formed by use of a treatment liquid containing the second conductive polymer, for example, a dispersion liquid or a solution. As the second dopant, it is preferred to use a polymer dopant. These cases are preferable for reducing ESR and enhancing withstand voltage characteristics since the second conductive polymer layer can be densified, and dedoping of the dopant can be suppressed.

Thus, the second conductive polymer layer is preferably denser than the first conductive polymer layer. The denseness of the conductive polymer layer can be evaluated based on density observed from, for example, electron micrographs of cross-sections of both the conductive polymer layers.

A ratio of the dopant contained in the second conductive polymer layer preferably ranges from 10 parts by mass to 1,000 parts by mass, inclusive, with respect to 100 parts by mass of the second conductive polymer.

Examples of the basic compound include inorganic bases such as ammonia, and organic bases such as amine compounds. Among the basic compounds, amine compounds are preferable because a high effect of suppressing reduction of conductivity is obtained. The amine compound may be any of a primary amine, a secondary amine, and a tertiary amine. Examples of the amine compound may include aliphatic amines and cyclic amines. The basic compounds may be used alone or in combination of two or more basic compounds.

Examples of the aliphatic amine include alkylamines such as ethylamine, diethylamine, triethylamine, N,N-dimethyloctylamine, and N,N-diethyloctylamine; alkanolamines such as ethanolamine, 2-ethylaminoethanol, and diethanolamine; allylamines; and alkylenediamines such as N-ethylethylenediamine and 1,8-diaminooctane. Examples of the aliphatic amine include aminocyclohexane, diaminocyclohexane, and isophoronediamine. Examples of the aromatic amine include aniline and toluidine.

The cyclic amine is preferably a cyclic amine having a five-membered to eight-membered (preferably five-membered or six-membered) nitrogen-containing ring skeleton, such as pyrrole, imidazoline, imidazole, pyrazole, pyridine, pyrazine, pyrimidine or triazine. The cyclic amine may have one nitrogen-containing ring skeleton, or two or more (e.g., two or three) nitrogen-containing ring skeletons. When the cyclic amine has two or more nitrogen-containing ring skeletons, the nitrogen-containing ring skeletons may be the same or different.

The amine compound may have a substituent as necessary.

By, for example, gas chromatography (GC), it is examined whether or not the second conductive polymer layer contains an amine compound.

A ratio of the basic compound in the second conductive polymer layer preferably ranges from 5 parts by mass to 200 parts by mass, inclusive, or from 10 parts by mass to 100 parts by mass, inclusive, with respect to 100 parts by mass of the conductive polymer.

In view of enhancing covering property of the second conductive polymer layer over the first conductive polymer layer, the proportion (e.g., mass proportion) of the basic compound in the second conductive polymer layer is preferably higher than the proportion (e.g., mass proportion) of the basic compound (second basic compound) in the first conductive polymer layer.

The second conductive polymer layer may contain a silane compound (third silane compound). The third silane compound can be appropriately selected from the compounds exemplified for the second silane compound. In view of further reducing ESR of the entire conductive polymer layer, the second conductive polymer layer preferably does not contain a silane compound. Alternatively, even when the second conductive polymer layer contains the silane compound, a proportion (e.g., mass proportion) of the silane compound in the first conductive polymer layer is preferably higher than a proportion (e.g., mass proportion) of the silane compound in the second conductive polymer layer. Here, dedoping of the dopant in the first conductive polymer layer by the basic compound contained in the second conductive polymer is easily suppressed. In addition, since the proportion of the silane compound in the second conductive polymer layer is low, an increase in ESR is easily suppressed.

Since the low-molecular-weight dopant serves as an oxidizing agent and a dopant during the polymerization, it is preferable to use the low-molecular-weight dopant as the first dopant. Dedoping is apt to be particularly noticeable when the low-molecular-weight dopant is used. In general, occurrence of dedoping of a dopant increases ESR. Therefore, when the low-molecular-weight dopant is used as the first dopant, it is preferred to use a high-molecular-weight dopant for the second conductive polymer layer as the second dopant. This makes it possible to suppress dedoping from the second conductive polymer layer, and to suppress an increase of ESR. Accordingly, a molecular weight of the first dopant is preferably smaller than a molecular weight of the second dopant.

The second conductive polymer layer may further contain, as necessary, a known additive and a known conductive material (e.g., manganese dioxide or TCNQ complex salt) other than the conductive polymer.

(Others)

The second conductive polymer layer may be formed of one layer, or may be formed of a plurality of layers.

Preferably, the second conductive polymer layer includes a B layer (third layer) containing a basic compound, and a P2 layer (fourth layer) formed on the B layer, the P2 layer containing the second conductive polymer and the second dopant. The P2 layer is only required to contain at least the second conductive polymer and the second dopant, and may further contain the basic compound. The first conductive polymer layer and the P2 layer are each apt to be anionic, and thus formation of the P2 layer directly on the first conductive polymer layer results in low covering property. By providing the B layer, affinity between the first conductive polymer layer and the P2 layer can be enhanced, and therefore covering property of the second conductive polymer layer over the first conductive polymer layer is easily further enhanced.

The second conductive polymer layer may include a plurality of B layers and a plurality of P2 layers. It is desirable to alternately form the B layers and the P2 layers. Stacking of only the P2 layers makes it difficult to cover a lower layer with an upper layer due to electric charge repulsion. By disposing the B layer between the P2 layers, the lower P2 layer can be sufficiently covered with the upper P2 layer with the B layer interposed between the P2 layers, and thus covering property of the second conductive polymer layer is easily further enhanced.

In the second conductive polymer layer, the basic compound in the B layer may penetrates into the P2 layer when laminating the P2 layer. In the case of stacking the B layer and the P2 layer repeatedly, the basic compound in the B layer may penetrates into the P2 layer not only when stacking the P2 layer, but also when forming the B layer. In the second conductive polymer layer, a concentration of the basic compound in the B layer may be higher than a concentration of the basic compound in the P2 layer.

In view of suppressing a leakage current and further improving withstand voltage characteristics, a thickness (average thickness) of the second conductive polymer layer is preferably larger than a thickness (average thickness) of the first conductive polymer layer. This configuration is particularly effective when the first and second conductive polymer layers have mutually different configurations and roles. In a preferred exemplary embodiment, the P1 layer is formed by, for example, polymerizing a precursor of the first conductive polymer on the dielectric layer to generate the first conductive polymer, and depositing the generated first conductive polymer so as to cover the dielectric layer. The second conductive polymer layer is formed by use of a treatment liquid containing the second conductive polymer. When the first conductive polymer layer is formed by polymerization on the dielectric layer, the first conductive polymer easily penetrates into pores of a porous anode body, so that the first conductive polymer layer can be formed even on complicated inner wall surfaces of the pores. However, the first conductive polymer layer obtained in this method is apt to have a low density. Thus, it is preferred that the second conductive polymer layer is formed by use of the second conductive polymer polymerized in advance, and the thickness of the second conductive polymer layer is made larger than the thickness of the first conductive polymer layer. This makes it possible to further improve withstand voltage characteristics and leakage current characteristics of the whole conductive polymer layer.

The average thickness of the second conductive polymer layer ranges, for example, from 5 µm to 100 µm, inclusive, preferably from 10 µm to 50 µm, inclusive. A ratio of the average thickness of the second conductive polymer layer to the average thickness of the first conductive polymer layer is, for example, 5 times or more, preferably 10 times or more. When the average thickness and the ratio of the average thickness fall within such a range, strength of the whole conductive polymer layer can be increased.

(Cathode Layer)

The carbon layer is only required to have conductivity, and the carbon layer can be configured, for example, by use of a conductive carbon material such as graphite. For a silver paste layer, for example, there can be used a composition including a silver powder and a binder resin (e.g., an epoxy resin). The cathode layer is not limited to this configuration and is satisfactory as long as the cathode layer is configured to have a function of power collection.

The anode terminal and the cathode terminal can be configured to include, for example, a metal such as copper or a copper alloy. As a material of the resin outer package, there can be used, for example, an epoxy resin.

The electrolytic capacitor of the present disclosure is not limited to the electrolytic capacitor having the structure described above, and can be variously structured electrolytic capacitors. Specifically, the present disclosure can also be applied to a wound electrolytic capacitor and an electrolytic capacitor including a metal powder sintered body as the anode body.

[Method for Producing Electrolytic Capacitor]

An electrolytic capacitor can be produced through a step (first step) of forming a first conductive polymer layer on a dielectric layer of an anode body which is provided with the dielectric layer; and a step (second step) of forming a second conductive polymer layer on the first conductive polymer layer. The method for producing an electrolytic capacitor may include a step of preparing an anode body and a step of forming a dielectric layer on the anode body prior to the first step. The production method may further include a step of forming a cathode layer.

Hereinafter, the steps are described in more detail.

(Step of Preparing Anode Body)

In this step, the anode body is formed by a known method according to a kind of the anode body.

The anode body can be prepared by, for example, roughening a surface of a foil-like or plate-like substrate formed of a conductive material. The roughening may be performed, for example, by subjecting the surface of the substrate to etching (e.g., electrolytic etching) or by depositing particles of the conductive material on the surface of the substrate by use of a gas phase method such as vapor deposition, as long as irregularities are formed on the surface of the substrate.

In addition, a valve metal powder is prepared, and molded into a desired shape (e.g., block shape) while a rod-like anode lead is embedded in the powder at one end of the anode lead in a longitudinal direction, so that a molded body is obtained. This molded body may be sintered to form an anode body having porous structure in which an anode lead is embedded at one end of the anode lead.

(Step of Forming Dielectric Layer)

In this step, a dielectric layer is formed on the anode body. The dielectric layer is formed by anodizing the anode body through an anodizing treatment or the like. The anodization can be performed by a known method, for example, an anodizing treatment. The anodizing treatment can be performed by, for example, immersing the anode body in an anodizing solution to impregnate, with the anodizing solution, the surface of the anode body (an inner wall surface of pores or pits inside the surface of the anode body), and applying a voltage between the anode body as an anode and a cathode immersed in the anodizing solution. It is preferable to use, for example, a phosphoric acid aqueous solution as the anodizing solution.

(Step of Forming First Conductive Polymer Layer (First Step))

In the first step, a P1 layer (first layer) containing a first conductive polymer and a first dopant is formed so as to cover at least a part of the dielectric layer, and an S layer (second layer) containing a first silane compound is formed on the P1 layer. Accordingly, the first conductive polymer layer is formed so as to cover at least a part of the dielectric layer.

The P1 layer may be formed by use of a dispersion liquid or solution containing constituent components of the P1 layer such as the first conductive polymer and the first dopant. In a preferred exemplary embodiment, the P1 layer is formed on the dielectric layer by polymerizing a precursor of the first conductive polymer in the presence of the first dopant. The dielectric layer is formed on a surface of the anode body having many pores or pits (surface including inner wall surfaces of the pores or pits of the anode body). Therefore, by polymerizing the precursor on the dielectric layer, the first conductive polymer layer is easily formed even in interiors of pores or pits. The polymerization can be performed by chemical oxidation polymerization.

The polymerization may be performed in the presence of a catalyst for accelerating the polymerization. As the catalyst, ferrous sulfate, ferric sulfate or the like can be used. In addition, an oxidizing agent such as a persulfate (e.g., ammonium persulfate, sodium persulfate or potassium persulfate), or a metal sulfonate may be used. The polymerization may be performed in the presence of a second silane compound as necessary.

For the polymerization, a solvent (first solvent) for dissolving or dispersing a precursor of the conductive polymer may be used as necessary. Examples of the first solvent include water, a water-soluble organic solvent, and a mixture of water and a water-soluble organic solvent.

The S layer can be formed by applying a first silane compound to the P1 layer or by impregnating the P1 layer with a first silane compound. A first conductive polymer layer in which the P1 layer and the S layer are alternately stacked may be formed by repeating formation of the P1 layer and formation of the S layer in this order.

The S layer may be formed by use of a treatment liquid (first treatment liquid) containing the first silane compound. For the first treatment liquid, a solvent (second solvent) for dissolving or dispersing the first silane compound is used. Examples of the second solvent include water, an organic solvent, and a mixture of water and an organic solvent.

(Step of Forming Second Conductive Polymer Layer (Second Step))

In the second step, a second conductive polymer layer containing a second conductive polymer, a second dopant, and a basic compound is formed on the first conductive polymer layer so as to cover at least a part of the first conductive polymer layer. The second conductive polymer layer may be formed by polymerizing a precursor of the second conductive polymer in the presence of the second dopant on the first conductive polymer layer. However, for forming the second conductive polymer layer having dense film quality, it is preferred to form the second conductive polymer layer by use of a treatment liquid containing the second conductive polymer and the second dopant. The second conductive polymer layer is formed by, for example, impregnating the anode body having the first conductive polymer layer with a treatment liquid, and performing drying. Beside impregnating the anode body with a treatment liquid, the anode body is immersed in the treatment liquid, or the treatment liquid is added dropwise to the anode body, so that the anode body is impregnated with the treatment liquid.

The treatment liquid containing the second conductive polymer and the second dopant may contain a basic compound, or the second conductive polymer and the second dopant may be separately deposited on the first conductive polymer layer. The second step includes, for example, a step (step α) of impregnating the anode body, which is obtained in the first step and has the first conductive polymer layer, with a second treatment liquid containing a basic compound, performing drying, then impregnating the anode body with a third treatment liquid containing the second conductive polymer and the second dopant, and performing drying. Through step α, a second conductive polymer layer containing the second conductive polymer, the second dopant and the basic compound is formed.

In drying of the anode body in the second step and step α, the anode body may be heated as necessary.

Step α may be repeated. Here, a second conductive polymer layer can be formed in which B layers (third layers) containing a basic compound and P2 layers (fourth layers) containing a second conductive polymer and a second dopant are alternately stacked. By repeating step α, covering property of the second conductive polymer layer over the first conductive polymer layer can be enhanced.

As the second treatment liquid containing a basic compound, for example, a solution of the basic compound is used. As a solvent (third solvent) to be used for the solution, water is preferable, and a mixed solvent of water and an organic solvent may be used. Examples of the organic solvent include aliphatic alcohols having 1 to 5 carbon atoms, acetone, acetonitrile, benzonitrile, N,N-dimethylformamide and dimethyl sulfoxide. As the organic solvent, one solvent may be used alone, or two or more solvents may be used in combination.

Preferably, a dispersion liquid or solution containing the second conductive polymer and the second dopant is used as the treatment liquid (third treatment liquid or the like) containing the second conductive polymer and the second dopant. Such a treatment liquid contains the second conductive polymer, the second dopant and a solvent (fourth solvent). The treatment liquid containing the second conductive polymer and the second dopant may contain a basic compound as necessary. Use of the third treatment liquid facilitates formation of a dense second conductive polymer layer, and is preferable for reducing ESR and enhancing withstand voltage characteristics. Examples of the fourth solvent may include water, organic solvents and mixtures of water and the organic solvent. The organic solvent can be appropriately selected from those exemplified for the third solvent.

The second conductive polymer and/or second dopant dispersed in the dispersion liquid is preferably in a form of particles (or a powder). An average particle size of the particles dispersed in the dispersion liquid preferably ranges from 5 nm to 500 nm, inclusive. The average particle size can be determined, for example, from a particle size distribution obtained by a dynamic light scattering method.

The treatment liquid containing the second conductive polymer and the second dopant can be obtained by dispersing or dissolving the second conductive polymer, the second dopant, and a basic compound as necessary in a solvent. For example, a dispersion liquid (dispersion liquid D1) obtained by removing impurities from a polymerization liquid of the second conductive polymer, and then mixing the second dopant with the polymerization liquid, or a dispersion liquid (dispersion liquid D2) obtained by removing impurities from a polymerization liquid formed by polymerization of the second conductive polymer in the presence of the second dopant may be used as the treatment liquid containing the second conductive polymer and the second dopant. A basic compound may be added to any of the dispersion liquids as necessary.

When the second conductive polymer layer contains a silane compound, the second conductive polymer layer formed may be coated or impregnated with the silane compound. In addition, the silane compound may be added to the treatment liquid containing the second conductive polymer and the second dopant, such as the third treatment liquid, or may be added to the second treatment liquid.

The second treatment liquid and the third treatment liquid may contain known additives as necessary. An acid component may be added to the second treatment liquid as necessary.

(Step of Forming Cathode Layer)

In this step, a cathode layer is formed by sequentially stacking a carbon layer and a silver paste layer on the surface of the conductive polymer layer obtained in the second step.

EXAMPLES

Hereinafter, the present disclosure is specifically described with reference to examples and comparative examples; however, the present disclosure is not limited to the examples below.

Example 1

Electrolytic capacitor 100 shown in FIGURE was produced in the manner described below, and characteristics of the electrolytic capacitor were evaluated.

(1) Step of Preparing Anode Body 11

Metal powders made of tantalum were prepared, and the metal powders were molded into a rectangular parallelepiped shape while rod-like anode lead 16 was embedded in the metal powders at one end of the anode lead in a longitudinal direction. The molded body was sintered to prepare anode body 11 in which anode lead 16 was embedded at one end.

(2) Step of Forming Dielectric Layer 12

Anode body 11 was immersed in a phosphoric acid solution in a concentration of 0.02% by mass, and a voltage of 100 V was applied to anode body 11 to form dielectric layer 12 made of $Ta_2O_5$ on a surface of anode body 11.

(3) Step of Forming First Conductive Polymer Layer

A solution (solution A) was prepared by mixing 1 part by mass of 3,4-ethylenedioxythiophene as a polymerizable monomer, 0.9 parts by mass of ferric p-toluenesulfonate as a dopant component, and 11.5 parts by mass of n-butanol as a first solvent. Anode body 11 provided with dielectric layer 12 obtained in step (2) was immersed in the resulting solution A, taken out from the solution, and then dried to form a P1 layer.

Anode body 11 provided with the P1 layer was immersed in a n-butanol solution (first treatment liquid) containing 3-glycidoxypropyltrimethoxysilane in a concentration of 20% by mass, taken out from the solution, and then dried to form an S layer.

Formation of the P1 layer and formation of the S layer were alternately repeated, so that a first conductive polymer layer was formed so as to cover a surface of dielectric layer 12. An average thickness of the first conductive polymer layer was measured by a scanning electron microscope (SEM), and consequently, the average thickness was about 1 μm.

(4) Step of Forming Second Conductive Polymer Layer

Anode body 11 having the first conductive polymer layer obtained in step (3) was immersed in an aqueous solution (second treatment liquid) containing N,N-dimethyloctylamine as a basic compound in a concentration of 5% by mass, taken out from the solution, and dried to form a B layer.

Then, the anode body provided with the B layer was immersed in a dispersion liquid-like third treatment liquid containing poly(3,4-ethylenedioxythiophene) (PEDOT) as a second conductive polymer, and polystyrene sulfonic acid (PSS) as a second dopant, taken out from the second treatment liquid, and dried to form a P2 layer.

Formation of the B layer and formation of the P2 layer were alternately repeated, so that a second conductive polymer layer was formed so as to cover a surface of the first conductive polymer layer. An average thickness of the second conductive polymer layer was measured in the same manner as in the first conductive polymer layer, and consequently, the average thickness was about 30 μm. Thus, the first conductive polymer layer and the second conductive polymer layer were formed so as to cover a surface of dielectric layer 12.

A third treatment liquid was prepared in accordance with a procedure described below.

A 3,4-ethylenedioxythiophene monomer was added under stirring to an aqueous solution containing polystyrene sulfonic acid (sulfonation degree: 100 mol %), and then oxidizing agents (iron(III) sulfate and sodium persulfate) were added to the resulting mixture to perform chemical oxidation polymerization. The resulting polymerization liquid was subjected to filtration by ion-exchange equipment to remove impurities. Thus, a solution which contained PEDOT as a second conductive polymer and PSS as a second dopant was obtained. Purified water was added to the resulting solution, and the resultant mixture was homogenized by a high-pressure homogenizer and was further subjected to filtration by a filter to prepare a third treatment liquid. A ratio of PSS in the third treatment liquid was 4 parts by mass with respect to 100 parts by mass of PEDOT.

A cross-section of each of the first conductive polymer layer and the second conductive polymer layer in a thickness direction was observed with a scanning electron microscope, and consequently it was found that a coarse first conductive polymer layer was thinly formed at a side facing the dielectric layer. Then, a dense second conductive polymer layer was formed at a side opposite to the dielectric layer so as to cover the surface of the first conductive polymer layer.

(5) Step of Forming Cathode Layer

A dispersion liquid obtained by dispersing graphite particles in water was applied to anode body 11 provided with the second conductive polymer layer obtained in step (4), and was dried in air to form carbon layer 14 on at least a surface of the second conductive polymer layer.

Then, a silver paste containing silver particles and a binder resin (epoxy resin) was applied onto a surface of carbon layer 14, and the layer coated with the silver paste was heated to cure the binder resin, so that silver paste layer 15 was formed. Thus, a cathode layer composed of carbon layer 14 and silver paste layer 15 was formed.

(6) Assembling of Electrolytic Capacitor

Further, anode terminal 17, adhesive layer 18 and cathode terminal 19 were disposed on the anode body provided with the cathode layer obtained in step (5), and sealed with a resin outer package to produce an electrolytic capacitor.

Example 2

In step (3) of Example 1, 3-mercaptopropyltrimethoxysilane was used in place of 3-glycidoxypropyltrimethoxysilane. An electrolytic capacitor was prepared in the same manner as in Example 1 except for this.

Example 3

In step (4) of Example 1, 1,8-diaminooctane was used in place of N,N-dimethyloctylamine. An electrolytic capacitor was prepared in the same manner as in Example 1 except for this.

Comparative Example 1

In step (3) of Example 1, the S layer was not formed. The immersion in the solution A and the drying of anode body 11 provided with the dielectric layer were repeated to form a first conductive polymer layer composed of only the P1 layer. An electrolytic capacitor was prepared in the same manner as in Example 1 except for these.

Comparative Example 2

In Comparative Example 1, a second treatment liquid was prepared using 1,8-diaminooctane in place of N,N-dimethyloctylamine. An electrolytic capacitor was prepared in the same manner as in Comparative Example 1 except for this.

Comparative Example 3

In step (4) of Example 1, the immersion in the third treatment liquid and the drying of anode body 11 provided with the first conductive polymer layer without forming the B layer were repeated. However, an adequate P2 layer could not be formed.

(Evaluation)

Evaluations described below were performed using the electrolytic capacitors of examples and comparative examples.

An ESR value (initial ESR value: ESRa) (mΩ) at a frequency of 100 kHz was measured at a temperature of 125° C. for the electrolytic capacitor with an LCR meter for 4-terminal measurement. Then, a voltage of 16 V was applied to the electrolytic capacitor at a temperature of 125° C. for 500 hours, and then the ESR value (ESRb) (me) was measured in the same manner as in the ESRa.

ESRa and ESRb were measured for randomly selected 120 electrolytic capacitors, respectively, and average values of the ESRa and the ESRb were each calculated. Then, a change rate of ESR was calculated in accordance with the following formula, and a ratio of the change rate of ESR with respect to a change rate in Comparative Example 2 was determined by a percentage of the change rate (change rate R (%)) at the time when the change rate in Comparative Example 2 was taken as 100%.

Change rate of ESR=(ESRb−ESRa)/ESRb

Table 1 shows results of the examples and the comparative examples. A1 to A3 denote Examples 1 to 3, respectively, and B1 to B3 denote Comparative Examples 1 to 3, respectively.

TABLE 1

|  | Change Rate R (%) |
|---|---|
| A1 | 65.2 |
| A2 | 52.2 |
| A3 | 60.9 |
| B1 | 170 |
| B2 | 100 |
| B3 | — |

As shown in Table 1, the electrolytic capacitors of the examples exhibited that increase of ESR was reduced as compared with comparative examples.

The electrolytic capacitor according to an exemplary embodiment of the present disclosure can be used for various uses in which low ESR is required.

What is claimed is:

1. An electrolytic capacitor comprising:
   an anode body;
   a dielectric layer formed on the anode body;
   a first conductive polymer layer covering at least a part of the dielectric layer; and
   a second conductive polymer layer covering at least a part of the first conductive polymer layer,
   wherein:
   the first conductive polymer layer includes:
      a first layer containing a first conductive polymer and a first dopant, and covering at least a part of the dielectric layer; and
      a second layer formed on the first layer, and containing a first silane compound, and
   the second conductive polymer layer contains a second conductive polymer, a second dopant, and a first basic compound.

2. The electrolytic capacitor according to claim 1, wherein at least a part of the second layer is interposed between the first layer and the second conductive polymer layer.

3. The electrolytic capacitor according to claim 1, wherein a molecular weight of the first dopant is smaller than a molecular weight of the second dopant.

4. The electrolytic capacitor according to claim 1, wherein the first dopant is a monomer compound having an anionic group.

5. The electrolytic capacitor according to claim 1, wherein the first basic compound is an amine compound.

6. The electrolytic capacitor according to claim 1, wherein the first silane compound is a silane coupling agent.

7. The electrolytic capacitor according to claim 1, wherein the first layer further contains a second silane compound.

8. The electrolytic capacitor according to claim 7, wherein:
   the second conductive polymer layer further contains a third silane compound, and
   a proportion of the first silane compound in the first conductive polymer layer is higher than a proportion of the third silane compound in the second conductive polymer layer.

9. The electrolytic capacitor according to claim 1, wherein the second conductive polymer layer does not contain a silane compound.

10. The electrolytic capacitor according to claim 1, wherein:
    the first conductive polymer layer further contains a second basic compound, and
    a proportion of the first basic compound in the second conductive polymer layer is higher than a proportion of the second basic compound in the first conductive polymer layer.

11. The electrolytic capacitor according to claim 1, wherein the first conductive polymer layer does not contain a basic compound.

12. The electrolytic capacitor according to claim 1, wherein a thickness of the second conductive polymer layer is larger than a thickness of the first conductive polymer layer.

13. The electrolytic capacitor according to claim 1, wherein the second conductive polymer layer is denser than the first conductive polymer layer.

14. The electrolytic capacitor according to claim 1, wherein
    the second conductive polymer layer includes:
    a third layer containing the first basic compound; and
    a fourth layer formed on the third layer and containing the second conductive polymer and the second dopant.

15. The electrolytic capacitor according to claim 14, wherein:
    the second conductive polymer layer has a plurality of third layers including the third layer, and a plurality of fourth layers including the fourth layer, and
    each of the plurality of third layers and each of the plurality of fourth layers are alternately stacked.

16. The electrolytic capacitor according to claim 1, wherein:
    the first conductive polymer is obtained by polymerizing a precursor of the first conductive polymer on the dielectric layer, and
    the second conductive polymer layer is obtained by using a dispersion liquid or a solution which contains the second conductive polymer.

17. The electrolytic capacitor according to claim 1, wherein the silane coupling agent includes at least one of the group consisting of an epoxy group, an alkyl halide group, a ureido group, a mercapto group, an isocyanate group, a (meth)acryloyl group, and a vinyl group.

18. The electrolytic capacitor according to claim 1, wherein the silane coupling agent does not include an amino group.

* * * * *